United States Patent [19]

Hoaby

[11] Patent Number: 5,797,030
[45] Date of Patent: Aug. 18, 1998

[54] SYSTEM FOR OUTPUT RECORD HANDLER WITH LOGON REQUEST PROCESSOR THAT RECEIVES FIRST REQUEST THAT IS VALIDATED BY COMPARISION WITH FIRST AND SECOND ID/PASSWORD PAIRS

[75] Inventor: Scott Ernest Hoaby, Rochester, Minn.

[73] Assignee: International Business Machines Corporation, Armonk, N.Y.

[21] Appl. No.: 755,718

[22] Filed: Nov. 25, 1996

Related U.S. Application Data

[63] Continuation of Ser. No. 298,489, Aug. 30, 1994, abandoned.

[51] Int. Cl.$^6$ ................................................. G06P 13/00
[52] U.S. Cl. .......................... 395/827; 395/491; 395/188.01
[58] Field of Search .................................... 395/827, 491, 395/188.01

[56] References Cited

U.S. PATENT DOCUMENTS

| | | | |
|---|---|---|---|
| T102,102 | 8/1982 | Bolle et al. | 355/14 R |
| 4,805,134 | 2/1989 | Calo et al. | 364/900 |
| 4,881,179 | 11/1989 | Vincent | 364/518 |
| 4,942,606 | 7/1990 | Kaiser et al. | 380/4 |
| 4,980,719 | 12/1990 | Allen et al. | 355/201 |
| 5,034,770 | 7/1991 | O'Connell | 355/201 |
| 5,075,884 | 12/1991 | Sherman et al. | 395/650 |
| 5,077,795 | 12/1991 | Rourke et al. | 380/55 |
| 5,291,405 | 3/1994 | Kohari | 364/419.19 |
| 5,347,632 | 9/1994 | Filepp et al. | 395/200 |
| 5,379,340 | 1/1995 | Overend et al. | 379/93 |
| 5,404,523 | 4/1995 | DellaFera et al. | 395/650 |
| 5,509,074 | 4/1996 | Choudhury et al. | 380/23 |
| 5,638,511 | 6/1997 | Nexu | 395/187.01 |

OTHER PUBLICATIONS

IBM Technical Disclosure Bulletin, vol. 27, No. 7B, p. 4230, Dec. 1984, entitled "Transparent Access of Remote Resources" by M. R. Desrosiers et al.

Patent Application Locating and Monitoring (PALM) Management Manual, pp. 30–38, Jul. 1991.

Primary Examiner—Thomas C. Lee
Assistant Examiner—Anderson I. Chen
Attorney, Agent, or Firm—Steven W. Roth

[57] ABSTRACT

The Output Library Administrator of the present invention is comprised of three discrete components: an Output Record Handler, a Logon Request Processor, and a Call Command Processor. The Output Record Handler is responsible for interacting with the user to gather pertinent information about an output material file that the user wants processed. Once the Output Record Handler has assembled all of the necessary information, the Output Record Handler creates a record containing the information (i.e., the output material file, etc.) and stores the record in a library for later processing by the Logon Request Processor and the Call Command Processor. After the output file has been stored by the Output Record Handler, the output file remains in storage until further processing is requested by the user. To request processing of an output material file that has been stored by the Output Record Handler, the user merely goes to the output device and "logs on" via a keypad or other interactive device. The Logon Request Processor verifies whether the logon request is valid. If so, the Logon Request Processor passes control to the Call Command Processor which scans the library and returns a list of "outputable" files to be displayed to the user. The user then requests output of one or more files by issuing a Call Command via the output device.

16 Claims, 13 Drawing Sheets

Authorization Library

| User | Pswd. |
|------|-------|
| Paul | Dog |
| Jane | Bird |
| Jake | Cat |
| Sally | Fish |

FIG. 4C

Authorization Library

| User | Pswd. | Output Device |
|------|-------|---------------|
| Paul | Dog | Output Device 101<br>Output Device 107<br>Output Device 109 |
| Jane | Bird | Output Device 101<br>Output Device 109 |
| Jake | Cat | Output Device 101 |
| Sally | Fish | ALL |

Output Device Security Library

| Output Device | Security Classification |
|---|---|
| Output Device 101 | UltraSensative |
| Output Device 102 | Internal Use Only |
| Output Device 104 | Confidential |
| Output Device 106 | Confidential |
| Output Device 107 | Restricted |
| Output Device 109 | Internal Use Only |
| Output Device 111 | Restricted |

SYSTEM FOR OUTPUT RECORD HANDLER WITH LOGON REQUEST PROCESSOR THAT RECEIVES FIRST REQUEST THAT IS VALIDATED BY COMPARISION WITH FIRST AND SECOND ID/PASSWORD PAIRS

This application is a continuation in part, of application Ser. No. 08/298,489 filed Aug. 30, 1994 now abandoned.

FIELD OF THE INVENTION

The present invention relates to computer systems. More particularly, the present invention relates to controlling the output of a computer system.

BACKGROUND OF THE INVENTION

The EDVAC computer system of 1948 is often cited as the beginning of the computer era. What is often lost in these historical accounts, however, is the key role played by output devices. A computer system is useless if the results of its processing are unavailable to its users. For example, even the ENIAC device of the early 1940's utilized a crude printer to make its processing results available to its users. As computer systems became more and more powerful, it became possible to attach multiple output devices to individual computer systems. However, even though individual computer systems could handle multiple output devices, it was still not necessary for each computer system user to have his or her own personal output device. Therefore, the sharing of printers, plotters or similar output devices has become commonplace in today's office environment.

The way in which output devices are shared is largely dependent upon the configuration of the particular computer system. For example, in classic, host-centric computer system configurations, output devices are usually connected directly to a single computing device; whereas, in network oriented computer system configurations, output devices can be connected to personal user devices (e.g., PCs and the like), to file serving devices, or to both personal user devices and to file serving devices.

Regardless of the particular configuration chosen, there are some significant problems associated with sharing output devices. Perhaps the most significant of these problems is the inability of a requesting user to directly control the time at which submitted output materials are processed by a shared output device. Since the majority of output devices process output materials on a first come, first served basis, the requesting user may not know exactly how long it will be before their request is handled by the selected output device. Consequently, users are often forced to wait; they either wait at the location of the shared output device for their output materials to be generated or they wait until they are sure that their output materials have been generated before going to the location of the shared output device.

Both of these "waiting situations" can be very problematic in today's office environment. From a productivity standpoint, employee time spent waiting at a output device location is simply money down the drain. Similarly, unattended confidential or otherwise sensitive output materials can cause a significant security exposure.

Unfortunately, the two conventional solutions to this problem are simply inadequate. The most common of the conventional solutions is to require employees to wait in their office after submitting non-sensitive material and to wait at the output device location after submitting confidential or otherwise sensitive material. It is obvious, then, that this solution involves an inherent and undesirable trade-off between productivity and security.

The second conventional solution to these problems is to construct special secured output device rooms which are accessible to only certain authorized employees. However, secured output device rooms are themselves problematic because they are expensive and because they represent only a partial solution to the security problem. After all, the fact that an output device room is itself secure does not mean that all those who have access to the room are necessarily authorized to see all of the output materials that are generated by the output device. Therefore, in some cases at least, users are nevertheless required to wait at the output device location to ensure that sensitive output materials are not exposed to unauthorized individuals.

Without a way in which computer system users can be given control over the time at which their output materials are generated, users are left with the undesirable choice of waiting at the output device, thereby sacrificing productivity or retrieving their output materials some time after they are certain that the output materials have been generated, thereby sacrificing security.

SUMMARY OF THE INVENTION

It is therefore a principal object of the present invention to provide an enhanced method and apparatus for providing secure output control that does not require the user to trade security for productivity.

It is another object of the present invention to provide an enhanced method and apparatus for giving users direct control over the timing of output material generation.

It is still another object of the present invention to provide an enhanced method and apparatus for processing user initiated requests to process output materials, wherein the requests are initiated from the location of the output device itself.

It is yet another object of the present invention to provide an enhanced method and apparatus for the secure processing of user initiated requests to process output materials.

The foregoing objects are accomplished by the Output Library Administrator (OLA) disclosed herein. The OLA of the present invention is comprised of three discrete components: an Output Record Handler (ORH), a Logon Request Processor (LRP), and a Call Command Processor (CCP). The ORH is responsible for interacting with the user to gather pertinent information about output materials (the terms output material file, output material, output file, and file are used interchangeably throughout this document) that the user wants processed. While the exact information required is a question of implementation, identification of the output material file is a minimum requirement. Once the ORH has assembled all of the necessary information, the ORH creates a record containing the information (i.e., the output material file, etc.) and stores the record in a library for later processing by the LRP and CCP. After the output file has been stored by the ORH, the output file remains in storage until further processing is requested by the user or until the output file is handled by some other means (e.g., periodic removal or processing of output files for which a processing request is overdue). Since the output file has been stored away, the user is free to request and receive the output file when it is convenient and efficient to do so.

To request processing of an output file that has been stored by the ORH, the user merely goes to the output device and "logs on" via a keypad or other interactive device. The LRP verifies whether the logon request is valid. If so, the LRP passes control to the CCP which scans the library and returns a list of "outputable" files to be displayed to the user. The user then requests output of one or more files by issuing a Call Command via the output device. A Call Command includes identification information about the output file for which processing is being requested, location information about the output device itself, and any other information that may be required. Call Commands are received and processed by the CCP. The CCP checks the contents of the Call Command to ensure that all the information is appropriate. If the information is appropriate, the CCP retrieves the stored output file or files from 20 the library and dispatches it/them to the output device from which the user "called." If for some reason the information contained in the Call Command is inappropriate or incorrect for the particular situation, the CCP interacts with the user through the output device in an effort to resolve the problem.

By allowing the user to issue a Call Command at a convenient and efficient time, and if need be, in a secure environment, the OLA disclosed herein provides the user with secure, on-demand output control.

BRIEF DESCRIPTION OF THE DRAWINGS

FIG. 4C is a block diagram of the Authorization Library according to the preferred embodiment of the present invention.

FIG. 5A is a block diagram of the Authorization Library according to an alternate embodiment of the present invention.

FIG. 5B is a block diagram of the Output Device Security Library according alternate embodiment of the present invention.

DETAILED DESCRIPTION

Figure 1:
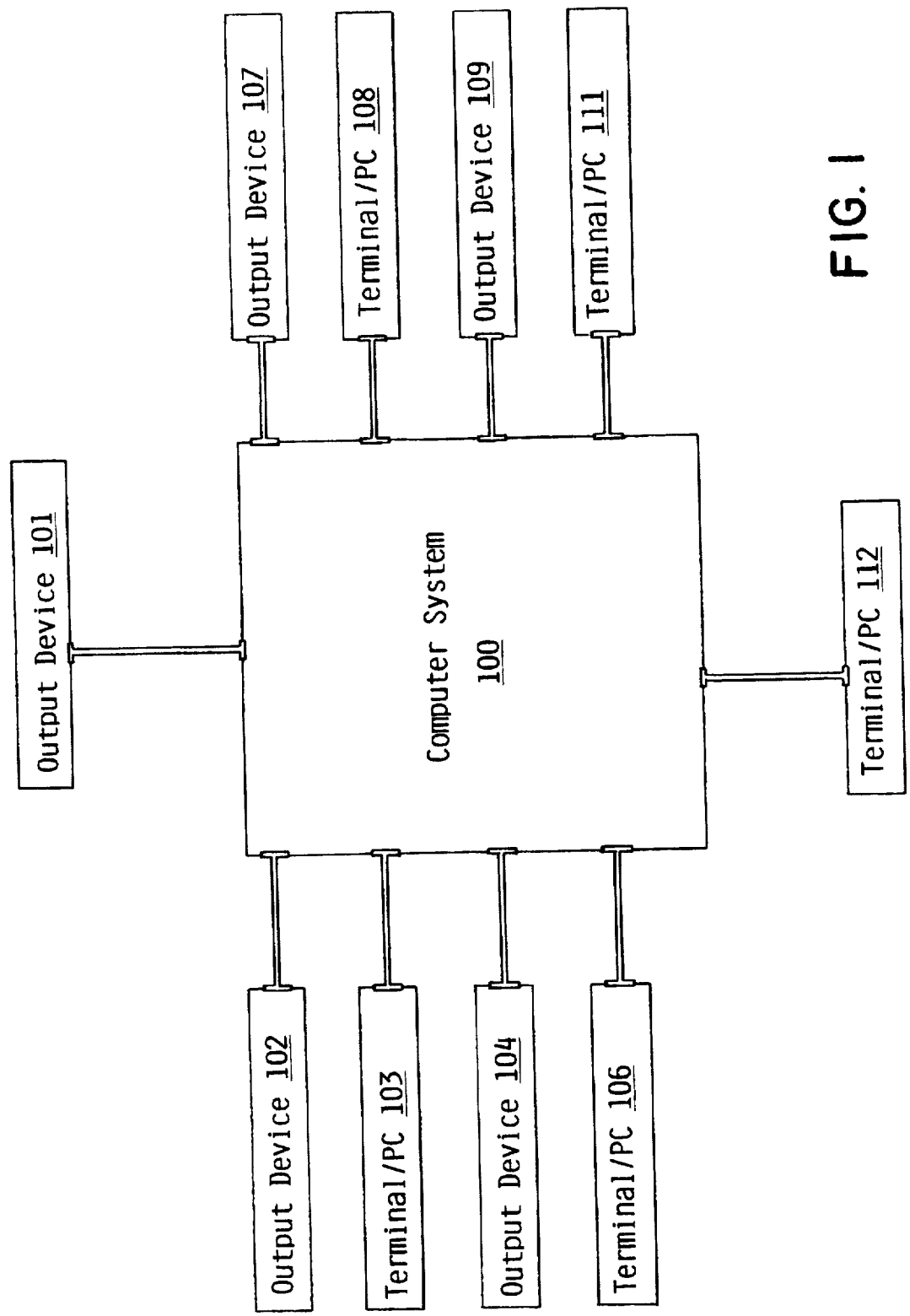
FIG. 1 is a block diagram of the physical configuration of the computer systems of the preferred embodiment.

FIG. 1 shows a block diagram of the computer system of the preferred embodiment. Computer System 100 is an enhanced IBM AS/400 mid-range computer system configured in a "host-centric" fashion. However, any computer system that supports multiple users could be used. Attached to computer system 100 are terminal/PCs 103, 106, 108, 111, and 112. The terminal/PCs of the preferred embodiment are IBM Personal System/2 personal computers running IBM PC Support/400. The terminal/PCs of the preferred embodiment are attached to Computer System 100 via token ring. It will be understood by those skilled in the art that while this particular type of terminal/PC has been chosen for the preferred embodiment, the present invention is not itself limited to any particular device or connection means. Indeed, virtually any input means that allows users to interact with a computer system could be used. For example, the present invention applies equally to host or server connected workstations as well as non-programmable terminals.

Output devices 101, 102, 104, 107, and 109 are also attached to Computer System 100. The output devices used in the preferred embodiment each include a display, a data entry mechanism, and a programmable CPU. It will be understood by those skilled in the art that the present invention applies equally to any form of output device that 1) includes the aforementioned characteristics and 2) is capable of delivering data in tangible form (e.g., plotter, computer connected copiers, video output mechanism, etc.).

Figure 2A:
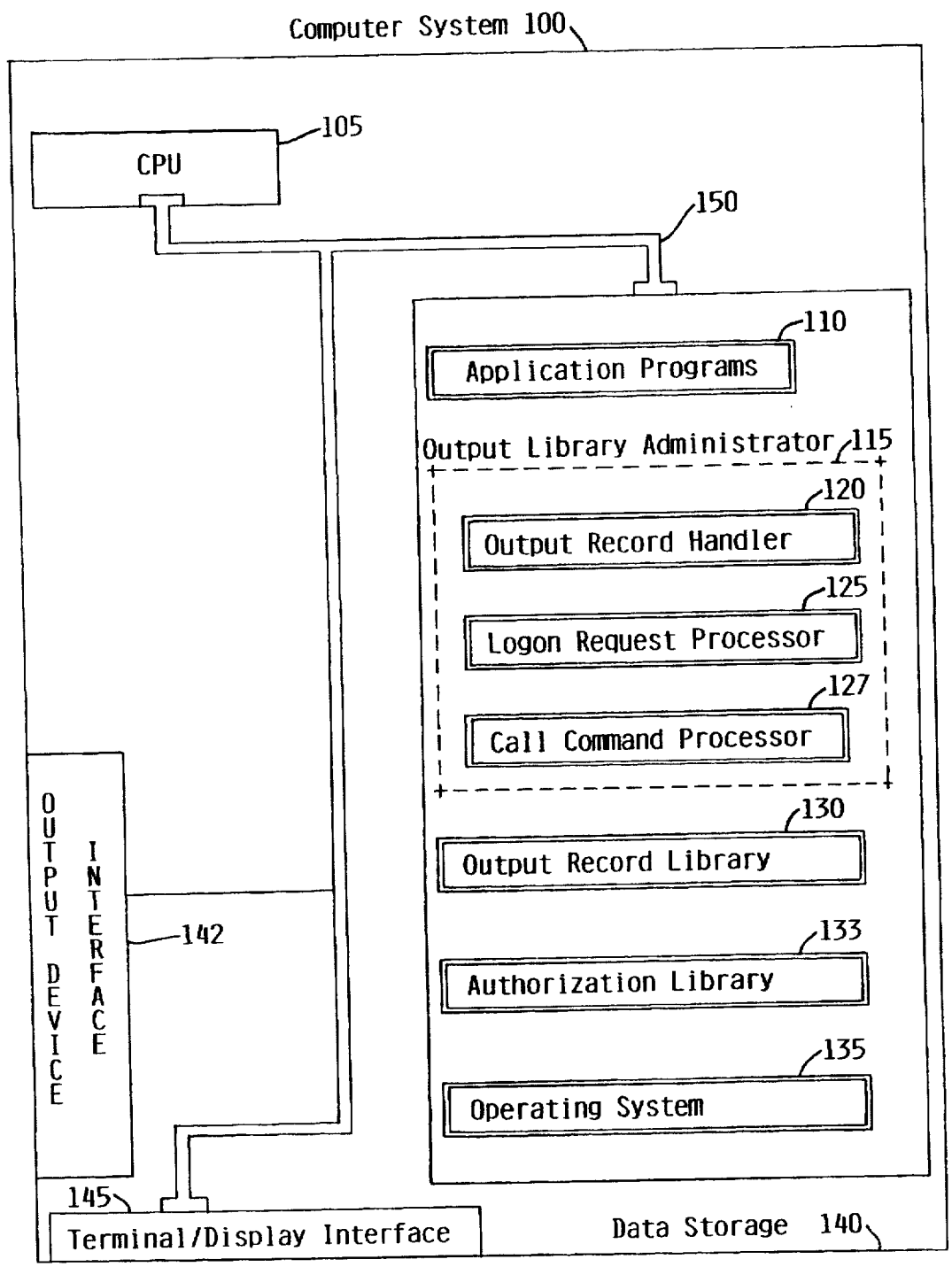
FIG. 2A is a block diagram of a computer system that has been suitably equipped to execute the mechanisms of the present invention.

FIG. 2A shows an exploded view of Computer System 100. Computer system 100 comprises main or central processing unit (CPU) 105 connected to data storage 140 and terminal interface 145 via system bus 150. Terminal interface 145 allows system administrators and computer programmers to communicate with Computer System 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional signal transfers could be used.

Data Storage 140 contains Application Programs 110, Output Library Administrator 115, Output Record Library 130, Authorization Library 133 and Operating System 135. While Data Storage 140 is shown as a monolithic entity, it should be understood that it may comprise a variety of devices, and that all programs and files shown will not necessarily be contained in any one device. For example, portions of Output Library Administrator 115 and Operating System 135 will typically be loaded into primary memory to execute, while portions of Output Record Library 130 may well be temporarily stored on magnetic or optical disk storage devices or in nonvolatile random access memory (RAM). While Operating System 135 is a multitasking operating system (i.e., IBM OS/400) it should be understood that the various mechanisms of the present invention could just easily be designed for a less powerful operating system such as DOS.

Output Library Administrator 115 is further shown to comprise Output Record Handler 120, Logon Request Processor 125, and Call Command Processor 127. Output Record Handler (ORH) 120, which is responsible for interacting with the user to place output materials into Output Record Library 130, will be explained through reference to FIGS. 3A–3C and the associated text. Logon Request Processor (LRP) 125, which is partially responsible for interacting with the user to retrieve output materials from Output Record Library 130, will be explained through reference to FIGS. 4A, 4C, and 4D. Call Command Processor (CCP) 125, which is also partially responsible for interacting with the user to retrieve output materials from Output Record Library 130, will be explained through reference to FIGS. 4B and 4D.

Figure 2B:
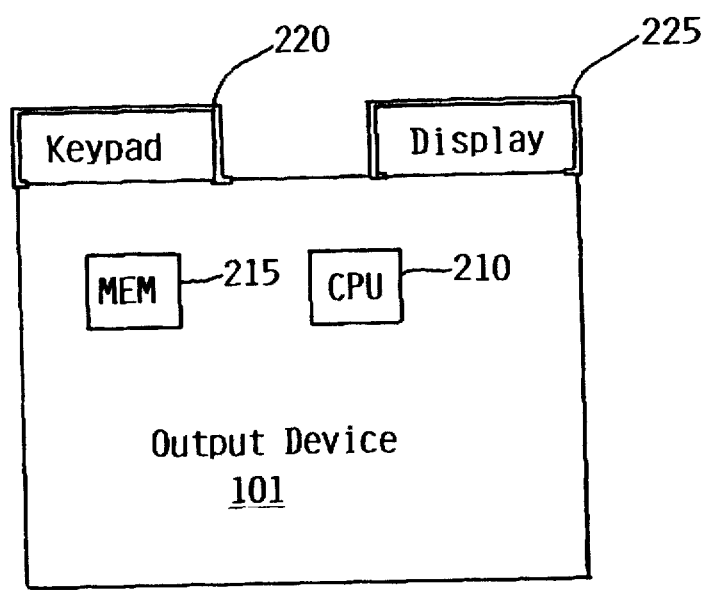
FIG. 2B is a block diagram of an output device that has been suitably equipped execute the mechanisms of the present invention.

FIG. 2B is a block diagram of the output device of the preferred embodiment. Output Device 101 comprises CPU 210, Memory (MEM) 215, Keypad 220, and Display 225. CPU 210 is a microprocessor suitably programmed to carry out portions of the present invention (as shown on portions of FIGS. 4A and 4B). As with Data Storage 140, MEM 215 is used to store and execute the requisite computer programs. Keypad 200 provide a means through which users can input information to the present invention, while Display 225 is the means used by the invention to convey information to a user. Even though the input/output means used on the output devices of the preferred embodiment comprises a display and an alphanumeric keypad, it should be understood that any equivalent input/output means could be used. For example, the input/output means could be either combined into a single touch screen display or simply comprise an attached personal or laptop computer.

FIGS. 3A through 4E are detailed drawings which represent the internal structures and mechanisms that comprise the present invention. These structures and mechanisms will be best understood by way of example. Therefore, for the purposes of explanation, assume that a fictitious person named Sally wishes to process an output material file which contains some sensitive subject matter. Further assume that Sally wants to have the output material file processed at a later time by a yet to be defined output device.

Figure 3A:
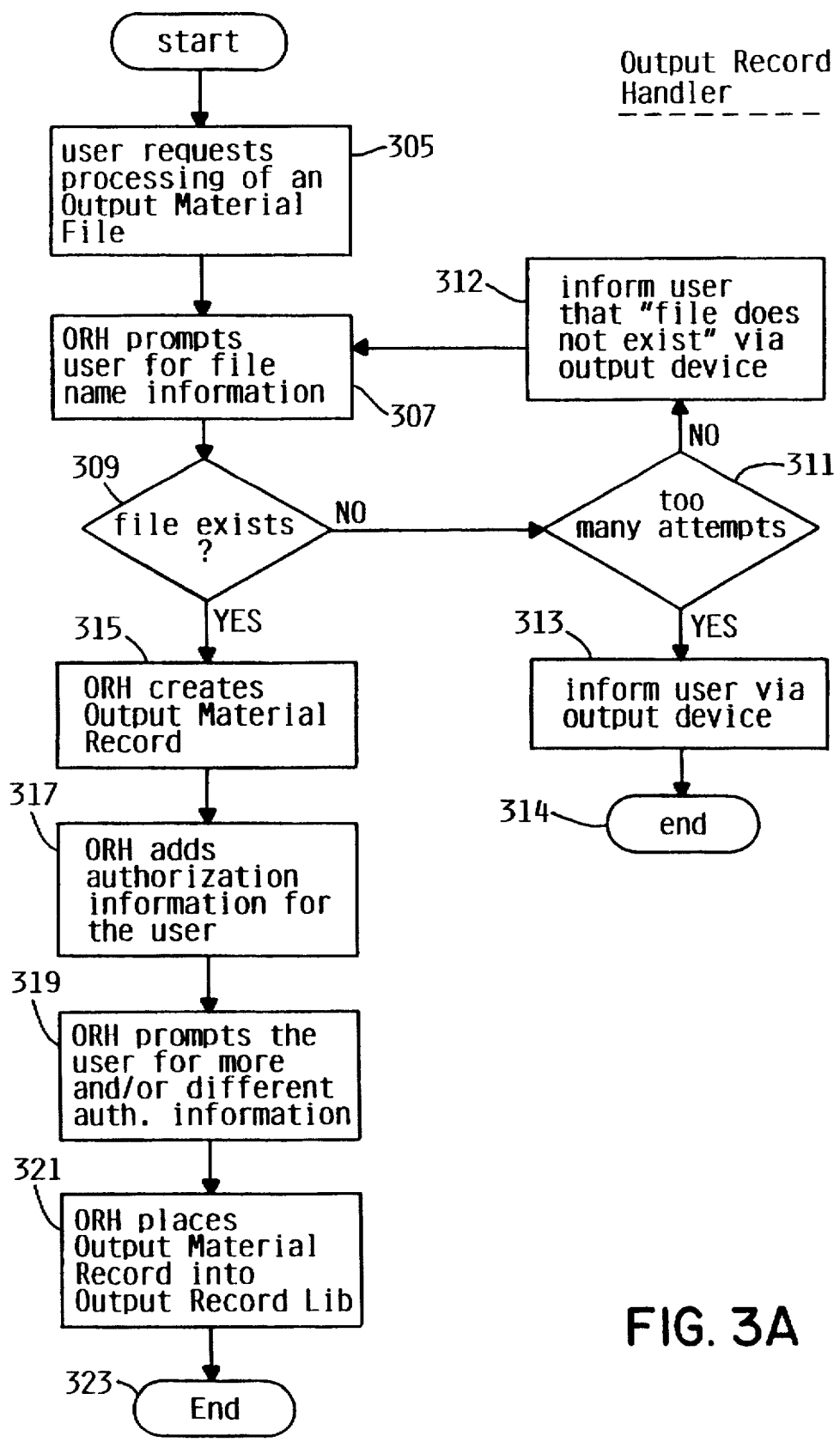
FIG. 3A is a flowchart of a method for carrying out the steps of the ORH according to the preferred embodiment of the present invention.

FIG. 3A is a flow diagram of Output Record Handler (ORH) 120 of the present invention. In general, ORH 120 is responsible for interacting with requesting users to determine certain parameters under which output material files will be processed and for creating output material records and storing them in a library. In our case, assume that terminal/PC 111 resides in Sally's office. Sally uses terminal/PC 111 to initiate a request to process an output material file. The particular means used to initiate a request are not important to the present invention. The request could be initiated via application programs 110 or via any other means for passing control of CPU 105 to ORH 120. Accordingly, a detailed explanation of the various ways in which such a request could be handled is not included herein. Sally's request is received by ORH 120 in block 305. After receiving the request, ORH 120 prompts Sally for entry of a file name [block 307]. The file name is later used by the present invention to assist users in identifying particular output material files. In block 309, ORH 120 determines whether a file matching the specified file name exists. In this example, the file that Sally is submitting is a standard text file; however, those skilled in the art will appreciate that the present invention applies equally to files that are pre-formatted for a particular type of output device, either before or during interaction with the present invention.

If the file name that Sally entered did not exist, ORH 120 would next determine whether a predetermined attempt threshold had been exceeded [block 311]. If the attempt threshold had not been exceeded, ORH 120 would next inform Sally that the specified file did not exist [block 312] and again proceed to prompt her for entry of the file name [block 307]. If Sally had continued to enter invalid file names, the number of attempts would have eventually exceeded the attempt threshold which would have caused ORH 120 to terminate in block 314 after informing Sally of the problem in block 313. In the preferred embodiment, blocks 305, 307, 309, 311, 312, 313, and 314 of ORH 120 execute on computer system 100; however, it should be understood that as an implementation choice certain portions of ORH 120 may well reside and execute on a terminal/PC.

Figure 3B:
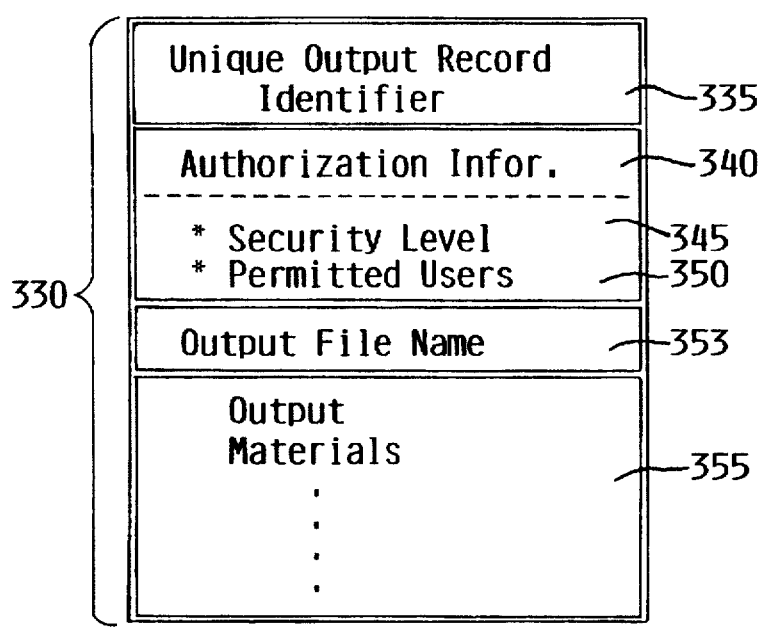
FIG. 3B is a block diagram of the Output Record Format according to the preferred embodiment of the present invention.

Since the file that Sally specified does exist, ORH 120 next creates an output material record. Output Material Record Format 330 of FIG. 3B is the chosen record format for output material records of the preferred embodiment. Output Material Record Format 330 comprises Unique Output Record Identifier Field 335, Authorization Information Field 340, Output Material File Name Field 353, and space for the output material itself (denoted as Output Material 335). Authorization information 340 further includes Security Level Field 345 and Permitted Users Field 350.

Returning to FIG. 3A, ORH 120 first creates a unique output record identifier and places it into field 335 [block 315]. Unique output record identifiers are, as the name suggests, identifiers which uniquely identify output material records within Computer System 100. Since the concept of unique identifiers is well known in the art, a detailed explanation of the various ways in which they can be implemented is not included herein. ORH 120 then places the output material and the output file name into fields 355 and 353 respectively [block 315]. In block 317, ORH 120 fills in fields 345 and 350 with authorization information from Sally's profile (not shown). Security Level Field 345 is used to store the security classification of the particular output material, while Permitted Users Field 350 is used to store user identification (i.e., user IDs) for those users who are to be given access to the output material. In the preferred embodiment, the stored security classification is used to place banners and the like (e.g., "Confidential") on output material that is eventually processed by an output device. Initially, Permitted Users Field 350 contains only the requesting user's user ID (i.e., Sally's user ID in this case).

In block 319, ORH 120 gives Sally the opportunity to add to or otherwise modify the authorization information that ORH 120 initially extracted from her profile. In our example, assume that Sally changed the security classification to be "UltraSensitive" because this output material contained salary information. Further assume that she added Paul and Jane (two managers that worked for Sally) as permitted users since she would also like Paul and Jane to have access to this output material. Once ORH 120 has fully constructed the output material record that is associated with Sally's output material file, ORH 120 places the record into Output Record Library [block 130] and terminates execution in block 323.

Figure 3C:
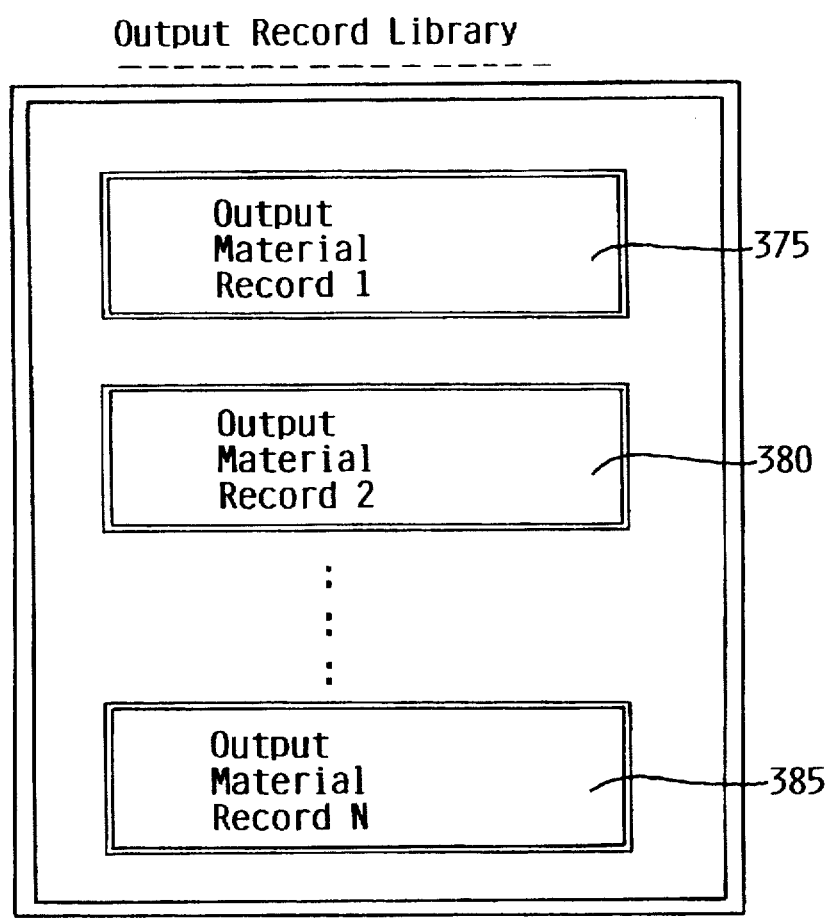
FIG. 3C is a block diagram of the Output Record Library according to the preferred embodiment of the present invention.

FIG. 3C shows example Output Record Library 130 of the preferred embodiment. Output Record Library 130 is the means by which records are stored and retrieved by the mechanisms of the present invention. As shown on FIG. 3C, Output Record Library 130 contains Output Material Records 375, 380, and 385. Assume for our purposes that the output material record associated with Sally's request is Output Material Record 380.

At this point, it is important to understand that Sally's output material, as represented by Output Material Record 380, is safely stowed away in Output Record Library 130. Sally need not "drop everything" and proceed directly to an output device to retrieve her sensitive output material, nor need she worry that her sensitive output materials will somehow be exposed to individuals who are not permitted to have access to the material (i.e., individuals other than Paul, Jane, and Sally herself).

Figure 4A:
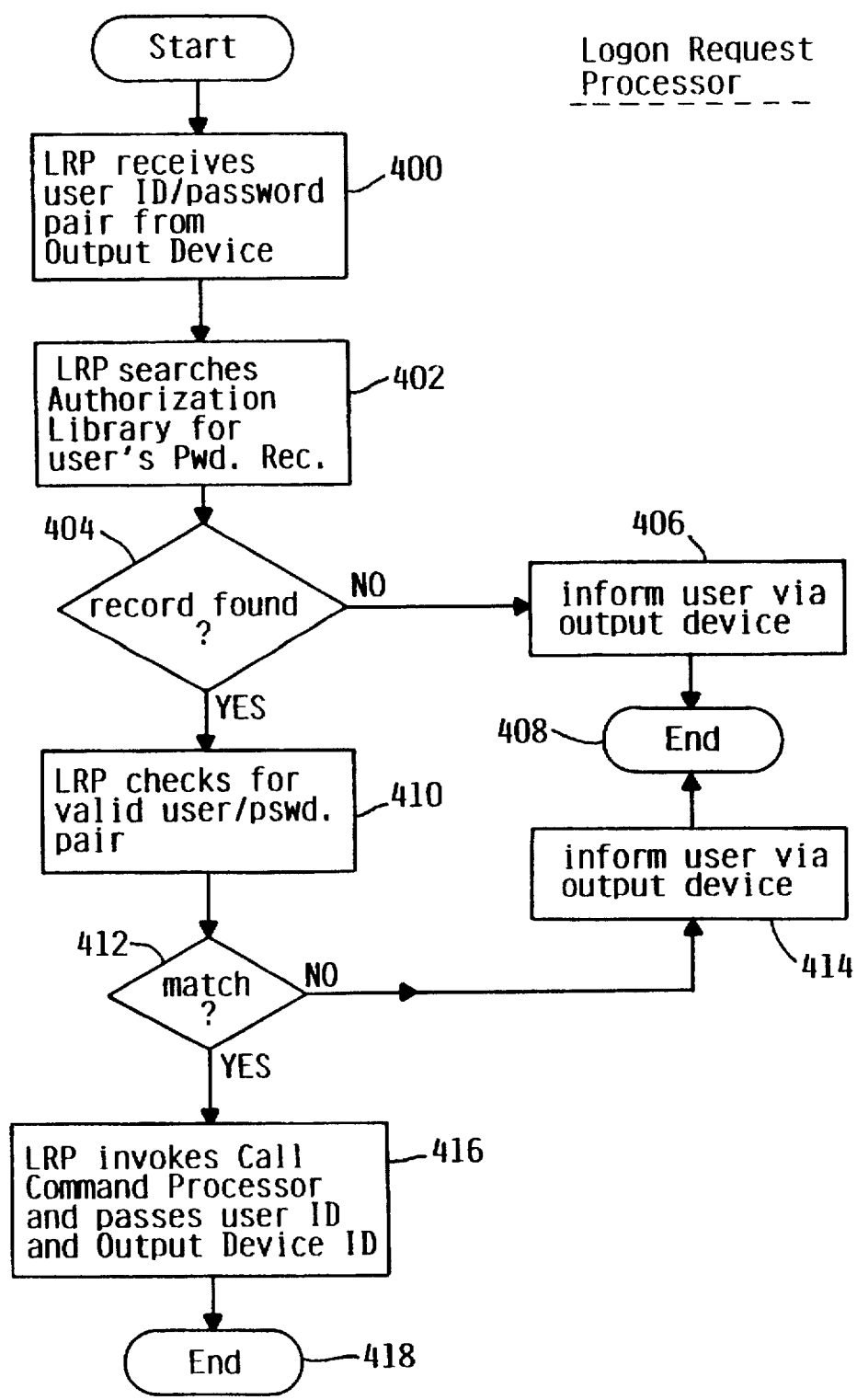
FIG. 4A is a flowchart of a method for carrying out the steps of the LRP according to the preferred embodiment of the present invention.

To gain access to the materials; be it an hour, a day or, a week later, the permitted users (i.e., Sally, Paul, and Jane)

need only proceed to their output device of choice and enter their user ID and their password. For example, assume that Sally told Jane about the availability of the output material and that Jane is interested in seeing the material right away. Since it is a convenient time for Jane to pick up the material, she proceeds to the closest output device, say Output Device 101, and enters her user ID (simply, "Jane") and her password ("Bird"). Output Device 101 sends Jane's user ID/password pair and its output device identifier to Computer System 100 where the information is received by Logon Request Processor (LRP) 125. Those skilled in the art will realize that it is a simple matter to program Output Device 101 to send this information to Computer System 100. FIG. 4A shows the inner workings of LRP 125 in greater detail. As mentioned, LRP 125 is responsible for processing user logon requests which are submitted from output devices. LRP receives Jane's user ID/password pair in block 400. In our example, Jane has entered her user ID and password via Keypad 220 on Output Device 101. While a user ID/password pair is used in the preferred embodiment to specifically identify a user, it should be understood that any identification means could be used. Therefore, advanced technology devices such as retinal scanners, fingerprint comparison units, futuristic DNA checking devices or any other type of alternative identity verification means should be considered within the spirit and scope of the present invention.

In block 402, LRP 125 searches Authorization Library 133 for an entry for Jane. Authorization Library 133 is shown on FIG. 4C. LRP 125 locates Jane's entry at 447 and confirms that Jane's password is "Bird." If LRP 125 had determined that a password record for Jane did not exist |block 404 of FIG. 4A| or that the password Jane entered was not "Bird," LRP 125 would have terminated in block 408 after notifying Jane appropriately in block 406 or 414. In the preferred embodiment, the notification of blocks 406 and 414 (i.e., "Password Record Not Found" and "Invalid User ID/Password Pair") would have been accomplished via Display 225 of Output Device 101; however, it should be understood that any appropriate notification means could be used. Since Jane's password record does exist and LRP 125 was able to verify that Jane's password is "Bird," LRP 125 proceeds to invoke Call Command Processor (CCP) 127 in block 416. In doing so, LRP 125 passes Jane's user ID and the output device identifier for Output Device 101 (i.e., the output device from which 20 Jane "called") to CCP 127. Output device identifiers are used by the system to uniquely identify each output device. For the purposes of this example, assume that the output device identifier for Output Device 101 is "OD 101".

Figure 4B:
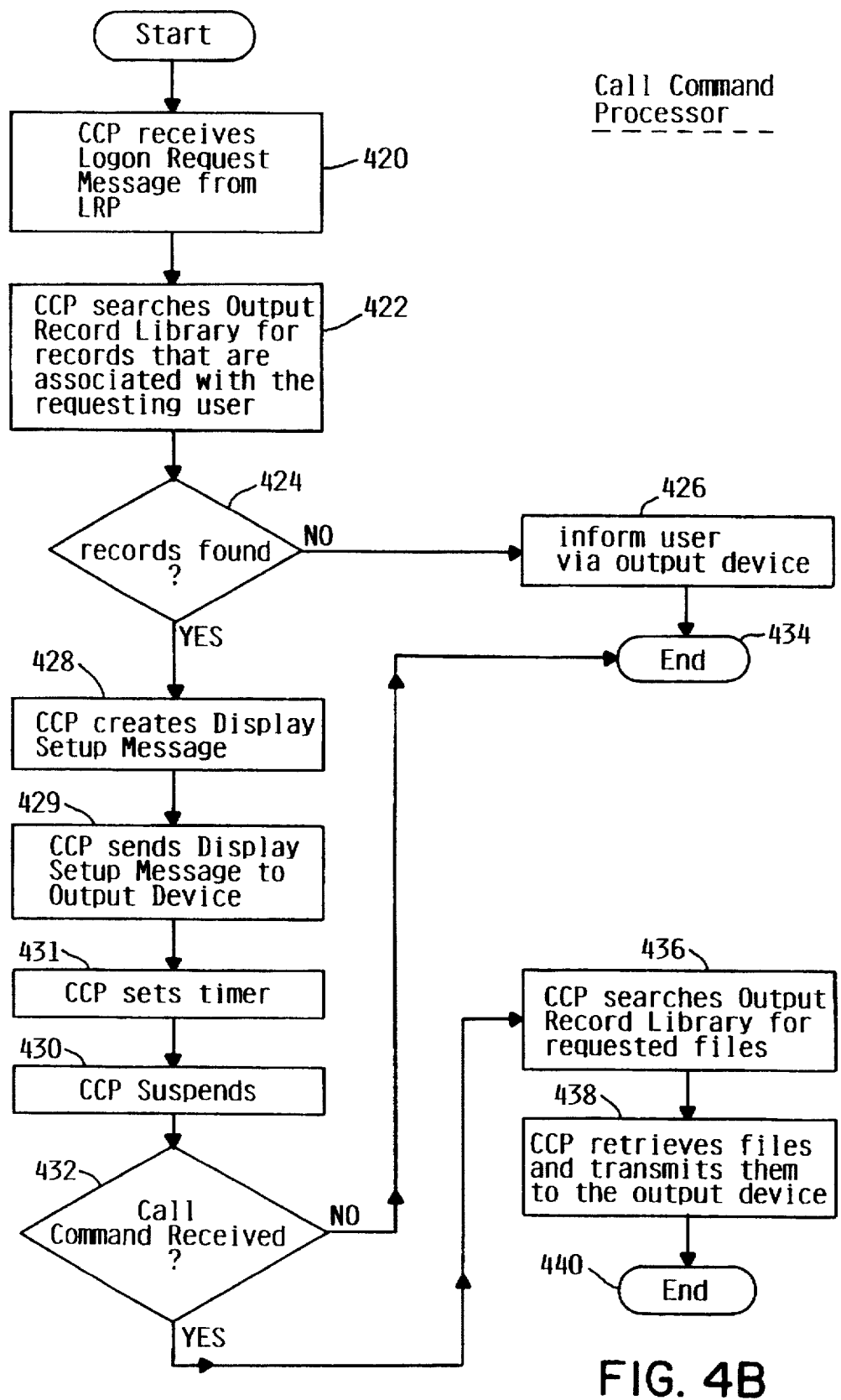
FIG. 4B is a flowchart of a method for carrying out the steps of the CCP according the preferred embodiment of the present invention.

FIG. 4B shows the inner workings of CCP 127 in greater detail. CCP receives Jane's user ID/password pair and the output device identifier for Output Device 101 in block 420. CCP 127 then proceeds to search Output Record Library 130 for records that are associated with Jane (i.e., those that have Jane's user ID as one of the permitted users in Permitted Users Field 350). Assume for the purposes of this example that CCP 127 locates Jane's user ID in Output Material Record 380 (i.e., the output material record associated with the output material submitted by Sally) and Output Material Record 375 (an output material record that is associated with output material that Jane herself had previously submitted). Had CCP 127 been unable to locate an output material record associated with Jane. CCP 127 would have informed Jane of such via Display 225 of Output Device 101 |block 426| and terminated in block 434. However, since CCP 127 was able to locate Output Material Records 375 and 380, CCP 127 creates a display setup message |block 428|. The display setup message is used to inform Jane of the existence of output files that she may process. At this point, it is important to point out that the mechanisms provided by the present invention are not solely designed for the processing of sensitive output materials. For example, a mechanism which allowed Jane to access unclassified output materials directly, with or without password protection, is also well within the spirit and scope of the present invention.

Figure 4D:
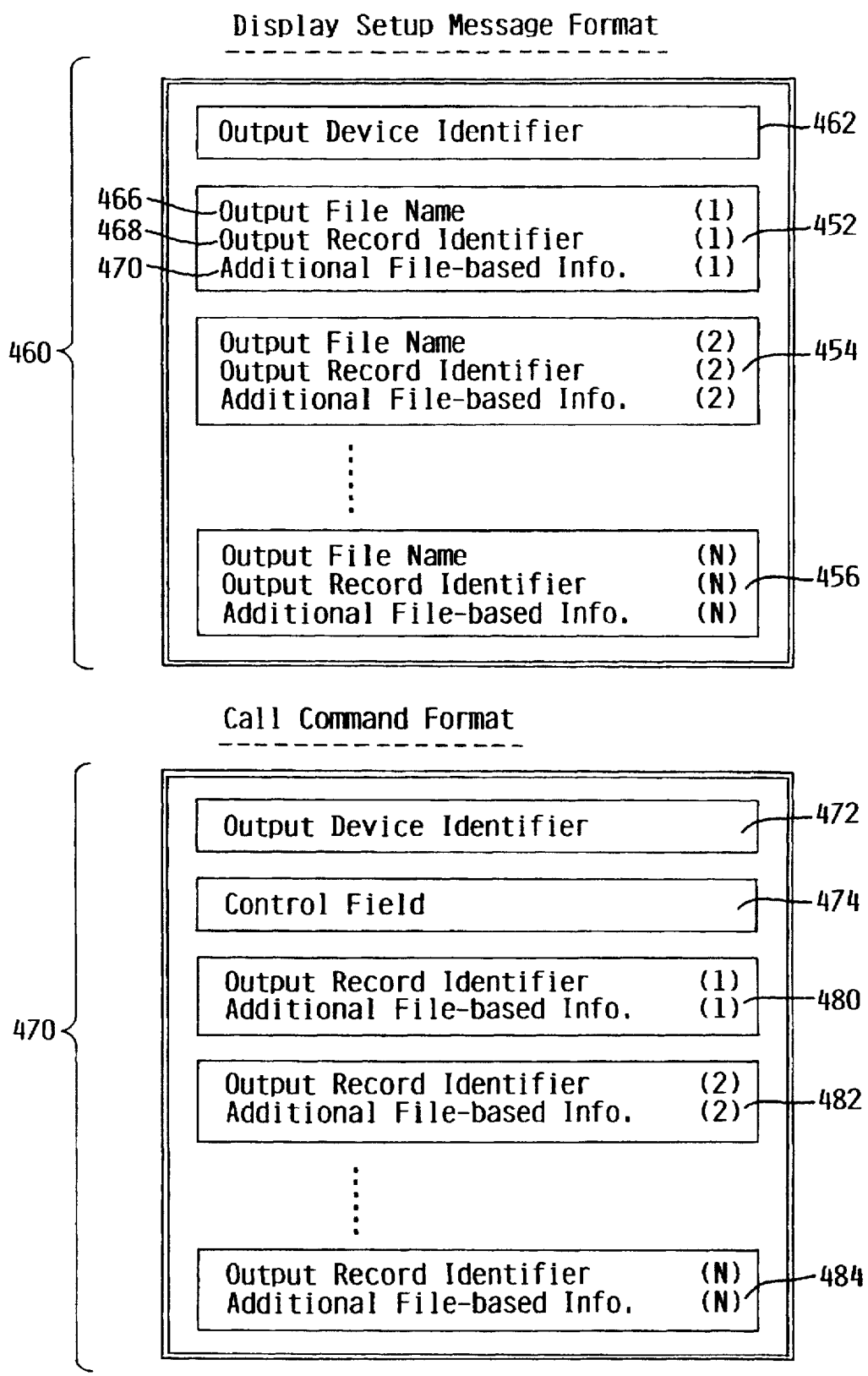
FIG. 4D is a block diagram of the Display Setup Message Format and the Call Command Format according to the preferred embodiment of the present invention.

FIG. 4D shows Display Setup Message Format 460. Display Setup Message Format 460 comprises Output Device Identifier Field 462 and File Blocks 452, 454, and 456. File Blocks 452, 454, and 456 further comprise Output File Name Field, Output Record Identifier, and Additional File-based Info. Fields (e.g., 466, 468, and 470 respectively). CCP 127 constructs a display setup message for Jane by first placing the output device identifier for Output Device 101 (i.e., OD101) into Output Device Identifier Field 462. CCP 127 then extracts the output file names, output record identifiers and additional file-based information from Output Material Records 375 and 380 (i.e., those records associated with Jane) and places the information into two separate record blocks (for this example assume that Record Blocks 452 and 454 are used). Once CCP 127 has created the display setup message for Jane's request, it sends it to Output Device 101 |block 429|. After the display setup message has been sent, CCP 127 sets a timer |block 431| and then suspends and waits for a call command |block 432|. CCP 127 wakes up upon receipt of a call command or upon the expiration of the timer it set in block 431. If CCP 127 wakes up because the timer it set expired, CCP 127 will terminate execution in block 434.

When Output Device 101 receives the display setup message, it presents the information to Jane via Display 225. Since Output Device 101 has only a simple, line oriented display, Jane is shown only the filenames associated with the output material files that she can process. Jane is then given the choice of processing all (i.e., both in this case) of the output materials files or any subset thereof. It should be understood, however, that user interface capability is a function of the limitations of the various output devices and that other more extravagant user interfaces are possible within the scope of the present invention. For example, a more advanced user interface such as one that represented each output material file in iconic form could also be used. A user interface of this type would allow users to select output material files by "clicking on them" with a pointing device, or by dragging an iconic representation of a file onto an iconic representation of the output device itself. Further yet, the mechanisms of the present invention could be expanded to allow users to erase files as well.

For the purposes of this example, assume that Jane decides that she only wants to process the output material file that Sally submitted earlier. Therefore, Jane uses Keypad 220 to select Output Material Record 380 (i.e., the output material record associated with Record Block 454). This causes Output Device 101 to construct a call command. FIG. 4D shows Call Command Format 470. Call Command Format 470 comprises Output Identifier Field 472, Control Field 474, and Request Blocks 480, 482, and 484. While Request Blocks 480, 482, and 484 appear in Call Command Format 470 for the purposes of description, it should be understood that the format merely includes space for the Request Blocks and that the Request Blocks are only actually present in the call commands themselves. Output Device 101, which is suitably programmed to construct a call command, first places the output device identifier for Output Device 101 (i.e., OD101) into Output Device Identifier Field 472. Output Device 101 then extracts the output record identifier and additional file-based information that corresponds to Output Material Record 380 from the display setup message that it received for Jane's request. Output Device 101 then places the information into a single request block (for this example assume that Request Block 480 is used) and sends the constructed call command to CCP 127. Had Jane wanted to process all of the output material files available to her, she could have indicated such via Keypad 220. The programming of Output Device 101 would then have caused Output Device 101 to set a bit in Control Field 474 which CCP 127 would understand to mean that processing of all available output material files was being requested.

When CCP 127 receives the call command in block 432, CCP 127 then proceeds to search Output Record Library 130 [block 436] to retrieve the output material file associated with Jane's request (i.e., the output material file contained in Output Material Record 380) and send the output material file to Output Device 101 for processing (block 438). CCP 127 then terminates execution in block 440.

Figure 6:
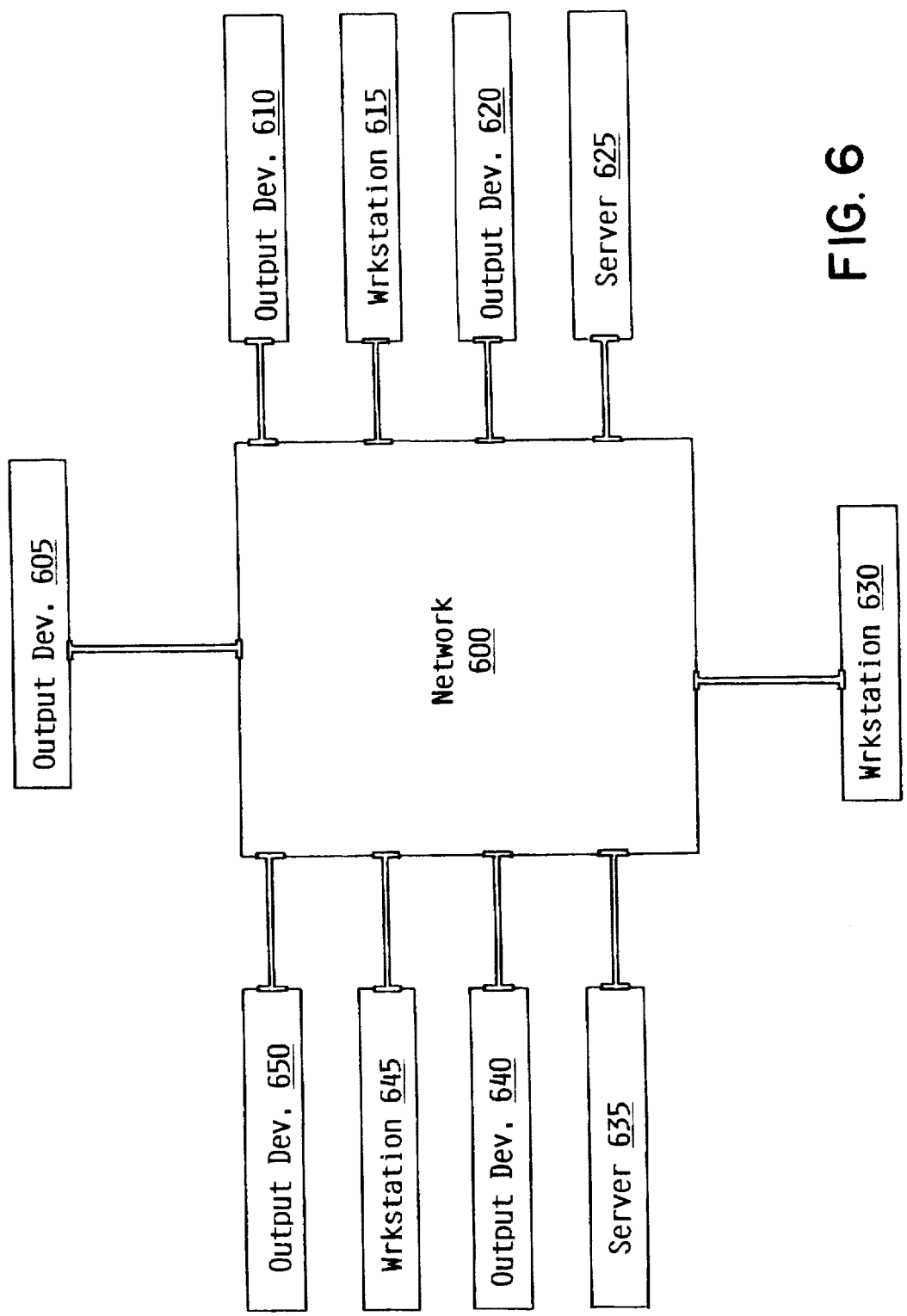
FIG. 6 is a block diagram of the physical configuration of the computer systems according to an alternate embodiment.

FIGS. 5A, 5B, 6 will now be used to describe alternate embodiments of the present invention. FIG. 5A shows Authorization Library 500 of a first alternate embodiment. This first alternate embodiment may be used in conjunction with any of the other embodiments described herein. As shown on FIG. 5A, the entries of Authorization Library 500 include an additional field relative to Authorization Library 133 of FIG. 4C. Authorization Library 500 resides in Data Storage 140 in the case of the preferred embodiment and in the equivalent data storage of at least one of servers 625 and 635 (FIG. 6) in the case of the third alternate embodiment. The additional field contains output device authorization information for users Paul, Jane, Jake, and Sally. The output device authorization is used to constrain the users to the use of specific output devices. For example, Jane used Output Device 101 to submit her request in the above example. Since Jane's entry in Authorization Library 500 indicates that she is authorized to use Output Device 101, the flow of the above example would have proceeded as was described. However, had Jane attempted to use Output Device 107 instead of Output Device 101, LRP 125 would have rejected Janes request (i.e., in a modified block 410).

FIG. 5B shows Output Device Security Library 550 of a second alternate embodiment. This second alternate embodiment may be used in conjunction with any of the other embodiments described herein. Output Device Security Library 550 resides in Data Storage 140 when used as an alternate to the preferred embodiment and in the equivalent data storage of at least one of servers 625 and 635 (FIG. 6) when used as an alternate to the third alternate embodiment. Output Device Security Library 550 comprises entries which correlate output devices with a highest permissible security classification. The highest permissible security classification is used to prevent users from using an output device to process output materials with security levels higher than that marked in the Security Classification field of the entry associated with the subject output device. Assume, for example, that the Internal Use, Confidential, Restricted, and UltraSensitive security classifications denote incrementally higher and higher security levels. If this were the case, Jane would not have been able to process Sally's UltraSensitive output file using Output Device 104 because LRP 125 would have rejected Jane's request (i.e., in a modified block 410).

FIG. 6 shows Network 600 of a third alternate embodiment. In this alternate embodiment, the mechanisms described above are spread out onto the intelligent devices of Network 600. ORH 120 resides and executes on Workstations 615, 630, and 645; while LRP 125, CCP 127, and libraries 130 and 133 reside on at least one of servers 625 and 635. ORH 120 places output records into Output Record Library 130 by sending the records to a server node for placement in Output Record Library 130.

Those skilled in the art will appreciate that the particular means used to 1) deliver output records to a server and to 2) place records into Output Record Library 130 is not important to the present invention. Once the records are placed in Output Record Library 130, the processing of user requests to LRP 125 and CCP 127 occurs in the manner described for the preferred embodiment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the present invention.

What is claimed is:

1. A computer system, said computer system comprising:

at least one system bus;

at least one CPU connected to said system bus;

at least one terminal/PC connected to a terminal interface, said terminal interface connected to said system bus;

at least one output device connected to an output device interface, said output device being used to process output materials, said output device interface connected to said bus; and data storage, said data storage connected to said system bus, said data storage containing at least:

an output library administrator, said output library administrator comprising an output record handler, a logon request processor, and a call command processor, said logon request processor being used to handle logon requests from users that wishes to initiate processing of said output materials, said logon requests respectively comprising first user ID/password pairs that are validated by said means for receiving through respective comparison to second user ID/password pairs, said second user ID/password pairs being respectively associated with said users;

an output record library; and an authorization library.

2. A data processing system, said data processing system comprising:

an output library administrator, said output library administrator comprising:

an output record handler, said output record handler comprising:

means for creating at least one output material record, said output material record comprising an output material file;

means for storing said at least one output material record into an output record library;

a logon request processor, said logon request processor comprising:

means for receiving a first request from at least one user to output said output material file, said first request comprising a first user ID/password pair that is validated by said means for receiving through comparison to a second user ID/password pair, said second user ID/password pair being associated with said at least one user, said first request being submitted from an output device, said output device having a display; and a call command processor, said call command processor comprising:

means for fetching said output material file from said output record library and:

means for routing said output material file to said output device for processing, said processing not involving presentation of said output material file on said display.

3. The output library administrator of claim 2 wherein said output record handling further comprises means for receiving a second request from said at least one user to create said output material record.

4. The output library administrator of claim 3 wherein said output record handler further comprises identification means contained in said second request, said identification means containing identification information about said at least one user, said identification information being used to indicate that said at least one user is permitted to access said output material file.

5. The output library administrator of claim 4 wherein said call command processor further comprises means for presenting a list of outputtable files to said at least one user.

6. The output library administrator of claim 5 wherein said call command processor further comprises means for said at least one user to interact with said output device to select output files from said list of outputtable files.

7. The output library administrator of claim 4 wherein said logon request processor further comprises:

means for validating that said at least one user is permitted to use said output device to output selected output material files;

means for rejecting said first request whenever said at least one user is not permitted to use said output device to output selected output material files; and means for honoring said first request whenever said at least one user is permitted to use said output device to output selected output material files.

8. The output device controller of claim 5 wherein said call command processor further comprises:

means for validating that said output device has a high enough permissible security classification to output selected output material files;

means for rejecting said first request whenever said output device does not have a high enough permissible security classification to output selected output material files; and means for honoring said first request whenever said output device does have a high enough permissible security classification to output selected output material files.

9. A computer system network, said computer system network having a plurality of workstations, servers, and output devices, said computer system network comprising:

an output library administrator, said output device controller comprising:

an output record handler, said output record handler residing on each of said workstations and comprising:

means for creating at least one output material record, said output material record comprising an output material file;

means for storing said at least one output material record into an output record library, said output record library residing on at least one of said servers;

a logon request processor, said logon request processor residing on at least one of said output devices and comprising:

means for receiving a first request from at least one user to output said output material file, said first request comprising a first user ID/password pair that is validated by said means for receiving through comparison to a second user ID/password pair, said second user ID/password pair being associated with said at least one user, said first request being submitted from an output device, said output device having a display; and a call command processor, said call command processor residing on at least one of said servers and comprising:

means for fetching said output material record from said output record library; and means for routing said output material record to said output device for processing, said processing not involving presentation of said output material file on said display.

10. The output library administrator of claim 9 wherein said output record handling further comprises means for receiving a second request from said at least one user to create said output material record.

11. A method for providing output control to at least one user, said method comprising the computer implemented steps of:

creating at least one output material record, said output material record comprising an output material file;

storing said at least one output material record into an output record library;

receiving a first request from said at least one user to output said output material file, said first request comprising a first user ID/password pair that is validated by said means for receiving through comparison to a second user ID/password pair, said second user ID/password pair being associated with said at least one user, said first request being submitted from an output device, said output device having a display;

fetching said output material record from said output record library; and routing said output material file to an output device for processing, said processing not involving presentation of said output material file on said display.

12. The method of claim 11 wherein said creating step further comprises the step of receiving a second request from said at least one user to create said output material record.

13. The method of claim 12 further comprising the step of presenting a list of outputtable files to said at least one user.

14. The method of claim 13 further comprising the step of said at least one user interacting with said output device to select output files from said list of outputtable files.

15. The method of claim 14 further comprising the steps of:

validating that said user is permitted to use said output device to output selected output material files;

rejecting said first request whenever said at least one user is not permitted to use said output device to output selected output material files; and honoring said first request whenever said at least one user is permitted to use said output device to output selected output material files.

16. The method of claim 14 further comprising the steps of:

validating that said output device has a high enough permissible security classification to output selected output material files;

rejecting said first request whenever said output device does not have a high enough permissible security classification to output selected output material files; and honoring said first request whenever said output device does have a high enough permissible security classification to output selected output material files.

* * * * *